United States Patent [19]
El Dessouky et al.

[11] Patent Number: 6,092,964
[45] Date of Patent: Jul. 25, 2000

[54] RIVET REMOVAL TOOL AND METHOD

[75] Inventors: Ahmed A. El Dessouky, Pico Rivera; Izya Lurye, Redondo Beach, both of Calif.

[73] Assignee: Textron Inc., Providence, R.I.

[21] Appl. No.: 09/082,197

[22] Filed: May 20, 1998

Related U.S. Application Data

[60] Provisional application No. 60/047,144, May 20, 1997.

[51] Int. Cl.$^7$ .............................. B23B 35/00; B23B 49/00
[52] U.S. Cl. .............................. 408/1 R; 408/84; 408/112
[58] Field of Search ................................ 408/1 R, 79, 84, 408/85, 86, 97, 110, 112

[56] References Cited

U.S. PATENT DOCUMENTS

| | | |
|---|---|---|
| 2,296,087 | 9/1942 | Burns, Jr. .................................. 408/84 |
| 2,409,589 | 10/1946 | Rocheville . |
| 2,576,786 | 11/1951 | Gray et al. ................................ 408/84 |
| 2,671,667 | 3/1954 | Flory ......................................... 408/84 |
| 3,015,240 | 1/1962 | Hodnett .................................... 408/84 |
| 5,318,390 | 6/1994 | DalBianco ................................ 408/84 |
| 5,551,816 | 9/1996 | Brewer et al. . |

*Primary Examiner*—Daniel W. Howell
*Attorney, Agent, or Firm*—Trexler, Bushnell, Giangiorgi & Blackstone, Ltd.

[57] ABSTRACT

A drill assembly for facilitating the removal of a rivet from a workpiece. The drill assembly includes a cutter housing which has an end portion that defines a recess for receiving a head of the rivet. The cutter housing also has a channel for receiving a cutter, and the channel communicates with the recess for cutting a notch in the head of the rivet. A longitudinal axis of the channel is offset from a longitudinal axis of the rivet when the head of the rivet is positioned in the recess defined by the end portion of the cutter housing.

29 Claims, 17 Drawing Sheets

RIVET REMOVAL TOOL AND METHOD

This application claims benefit of Provisional Application Ser. No. 60/047,144, filed May 20, 1997.

BACKGROUND

The fastener industry continues to improve the integrity of blind rivets, forming such rivets from a variety of materials as well as meeting a broad range of requirements dictated by various applications. Generally, a blind fastener or blind rivet includes at least a rivet sleeve, a mandril and a locking mechanism, and is used to fasten two or more pieces of material together (the workpiece) when only one side is accessible.

The improvements in the integrity of blind rivets present a problem when such a rivet needs to be removed from the workpiece. When a rivet needs to be removed from the workpiece, the rivet structures must be disassembled to disengage the rivet from the workpiece. The most common method for removing blind rivets from a workpiece is by drilling into the rivet. In this technique, a drill is used to drill out the core of the blind rivet thereby removing material which provides the mechanical strength and characteristics of the rivet to fasten the pieces of material together. As might be expected, this process is somewhat inaccurate, and it is difficult to remove blind rivets from a workpiece in this manner without damaging the workpiece.

One of the problems with removing a blind rivet is that the blind side is often inaccessible. When the rivet is drilled out to remove it from the workpiece, the rivet sleeve tends to engage the drill. This engagement may cause the rivet sleeve to spin within the workpiece bore. Rotary motion or spinning of the rivet sleeve within the workpiece bore during the drilling operation can enlarge the bore and cause damage to the workpiece. Thereafter, different, larger rivets will be needed to assure a secure fastening together of the materials. Additionally, positioning the drill tip on the central longitudinal axis of the rivet and maintaining the drill tip in this position during drilling is difficult. Should the drill bit become displaced from the longitudinal axis of the rivet head, the drill bit may skid across the surface of the workpiece. Of course, when the drill bit skids across the surface of the workpiece, the rotating drill bit can damage the workpiece.

OBJECTS AND SUMMARY

A general object of the present invention may be to provide a drill assembly for facilitating the accurate removal of a rivet from a workpiece without damaging the workpiece.

A further object of the present invention may be to provide a drill assembly for facilitating the accurate removal of a rivet from a workpiece bore while preventing the rivet from spinning in the bore.

A yet further object of the present invention may be to provide a drill assembly for engaging a notch in a head of a rivet in a workpiece while cutting generally into a longitudinal axis of the rivet.

Briefly, and in accordance with the foregoing, the present invention envisions a drill assembly for facilitating the removal of a rivet from a workpiece. The drill assembly includes a cutter housing which has an end portion that defines a recess for receiving a head of the rivet. The cutter housing also has a channel communicating with the recess for receiving a cutter for cutting a notch in the head of the rivet. A longitudinal axis of the channel is offset from a longitudinal axis of the rivet when the head of the rivet is positioned in the recess defined by the end portion of the cutter housing.

BRIEF DESCRIPTION OF THE DRAWINGS

The organization and manner of the structure and function of the invention, together with the further objects and advantages thereof, may be understood by reference to the following description taking in connection with the accompanying drawings, wherein like reference numerals identify like elements, and in which.

DESCRIPTION

Figure 1:
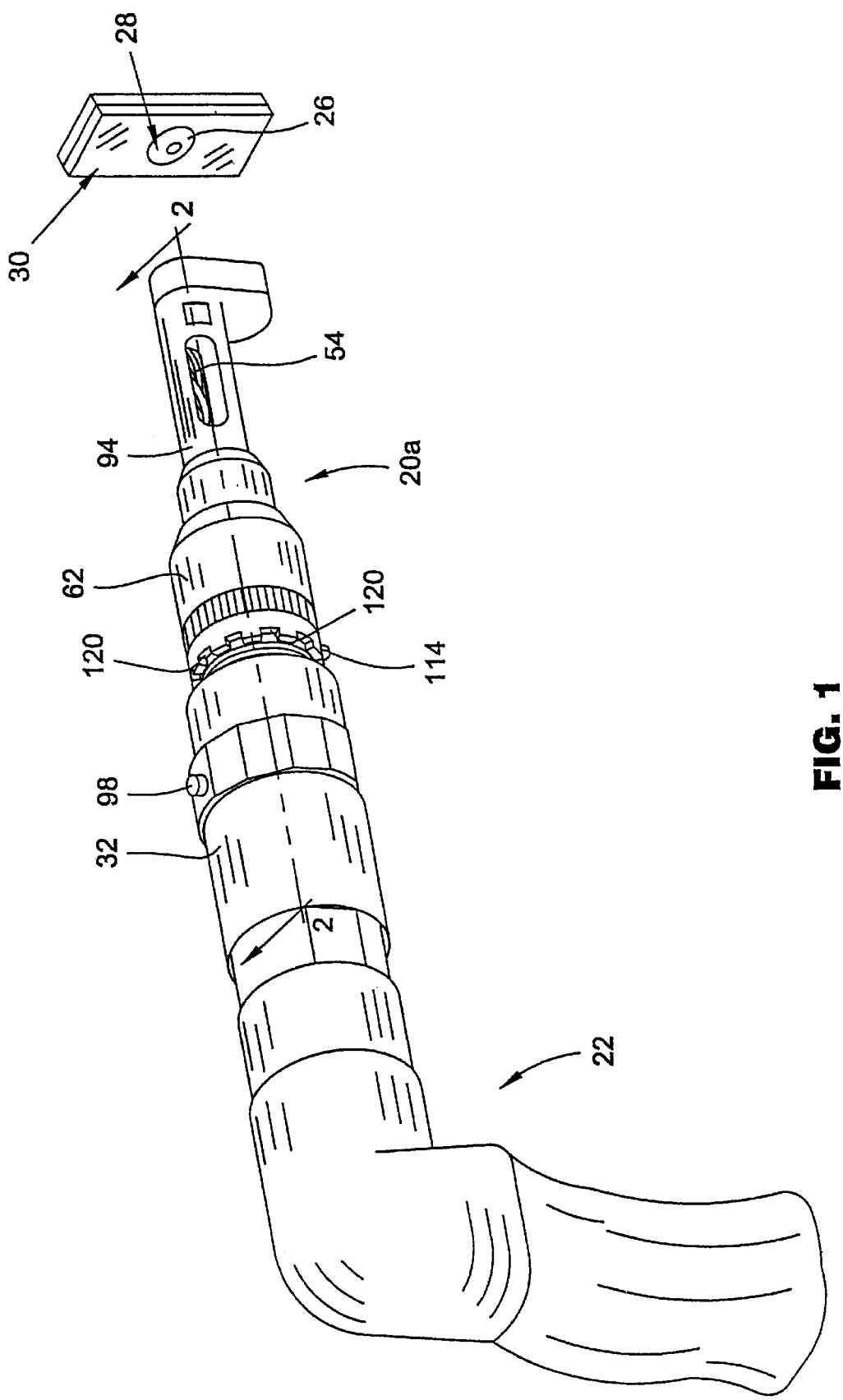
FIG. 1 is a perspective view of a drill tool employing a drill assembly in accordance with the present invention shown positioned in front of a rivet installed in a workpiece.
Figure 4:
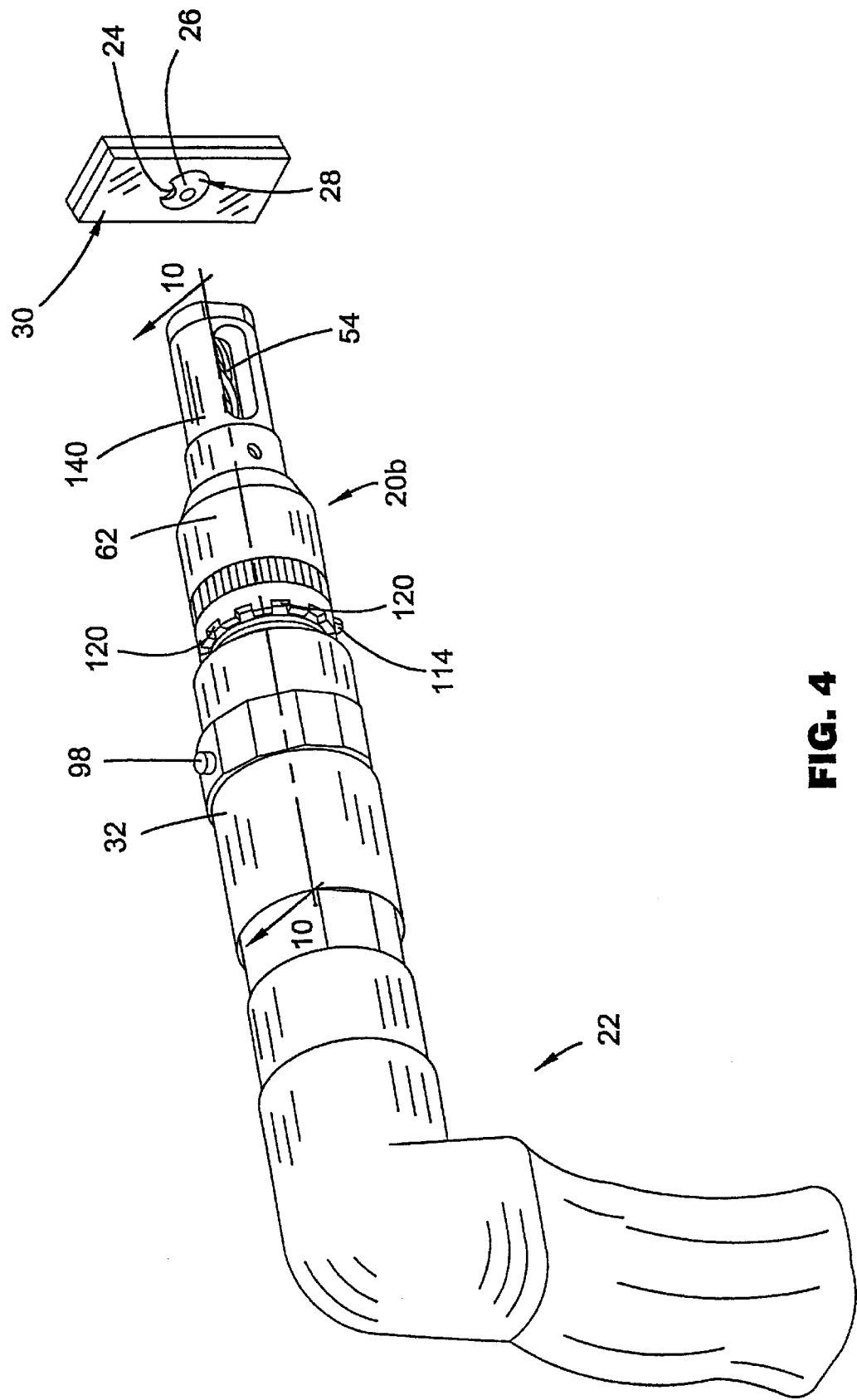
FIG. 4 is a perspective view of the drill tool of FIG. 1, shown employing another drill assembly in accordance with the present invention for drilling a rivet having a notch thereon which has been provided, for example, by using the drill tool employed with the drill assembly shown in FIG. 1.

Shown in FIGS. 1 and 4 are drill assemblies 20a and 20b, respectively, in accordance with the present invention and coupled to a drill tool 22. More specifically, FIG. 1 shows a drill assembly 20a in accordance with the present invention coupled to a drill tool 22 for drilling a notch 24 in a head 26 of a rivet 28 fastened in a bore 29 in a workpiece 30, and FIG. 4 shows an offset drill assembly 20b in accordance with the present invention coupled to a drill tool 22 for drilling out the rivet 28 while holding the notch 24 in the head 26 of the rivet 28.

Generally, both drill assemblies 20a, 20b include a housing 32 which threadably secures to the drill tool 22 via threads 23 adjacent an end 25 thereof (FIGS. 1 and 4 depict each drill assembly 20a and 20b, respectively, coupled to the drill tool 22, while FIGS. 2, 3, 7, 8 and 9 and FIGS. 5, 10, 11, 12, 14, 16 and 17 depict, for simplicity, the drill assemblies 20a and 20b, respectively, isolated from the drill tool 22). There are many elements which are common to both drill assemblies 20a, 20b. Therefore, common elements will be discussed first hereinbelow, and then the detail of the differences of the drill assemblies 20a, 20b will be presented subsequent to the general discussion. Unless otherwise noted one is hereby directed to view FIGS. 2 and 3 while reading the following general discussion with the understanding that in the other Figures, like parts are numbered with like reference numerals.

The drill tool 22 preferably provides a drive mechanism including a drive shaft. Within the housing 32 is a spindle 34 which is configured for engagement with the drive shaft of the drive mechanism. To this end, the spindle 34 may include engagement splines 36 for engaging corresponding splines on the drive shaft. The spindle 34 is retained in axial alignment with a central axis 38 by means of bearings 40 and 42.

Threads 44 are provided on an internal surface 46 of the spindle 34 at a distal end 48 thereof for engaging with threads 50 adjacent an end 52 of a cutter 54 such as a drill bit. For simplicity, the threads 44 and 50 are shown only in FIGS. 3 and 5 and are omitted from the remainder of the Figures. Threads 56 are also provided on an external surface 58 of the housing 32 for engaging with threads 60 provided on an adjustable collar 62.

Figure 3:
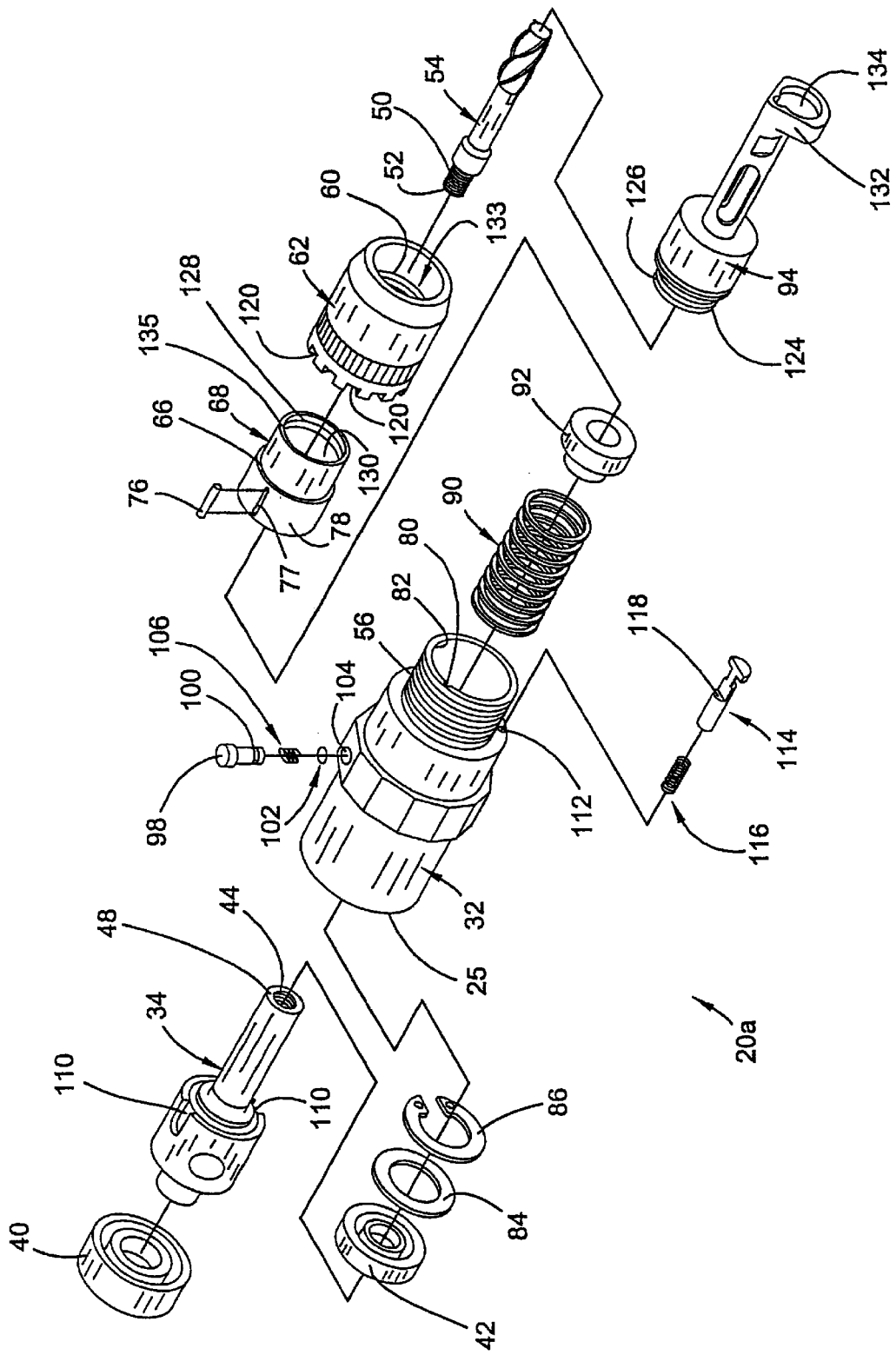
FIG. 3 is an exploded perspective view of the drill assembly shown in FIGS. 1 and 2, showing the internal components thereof.
Figure 5:
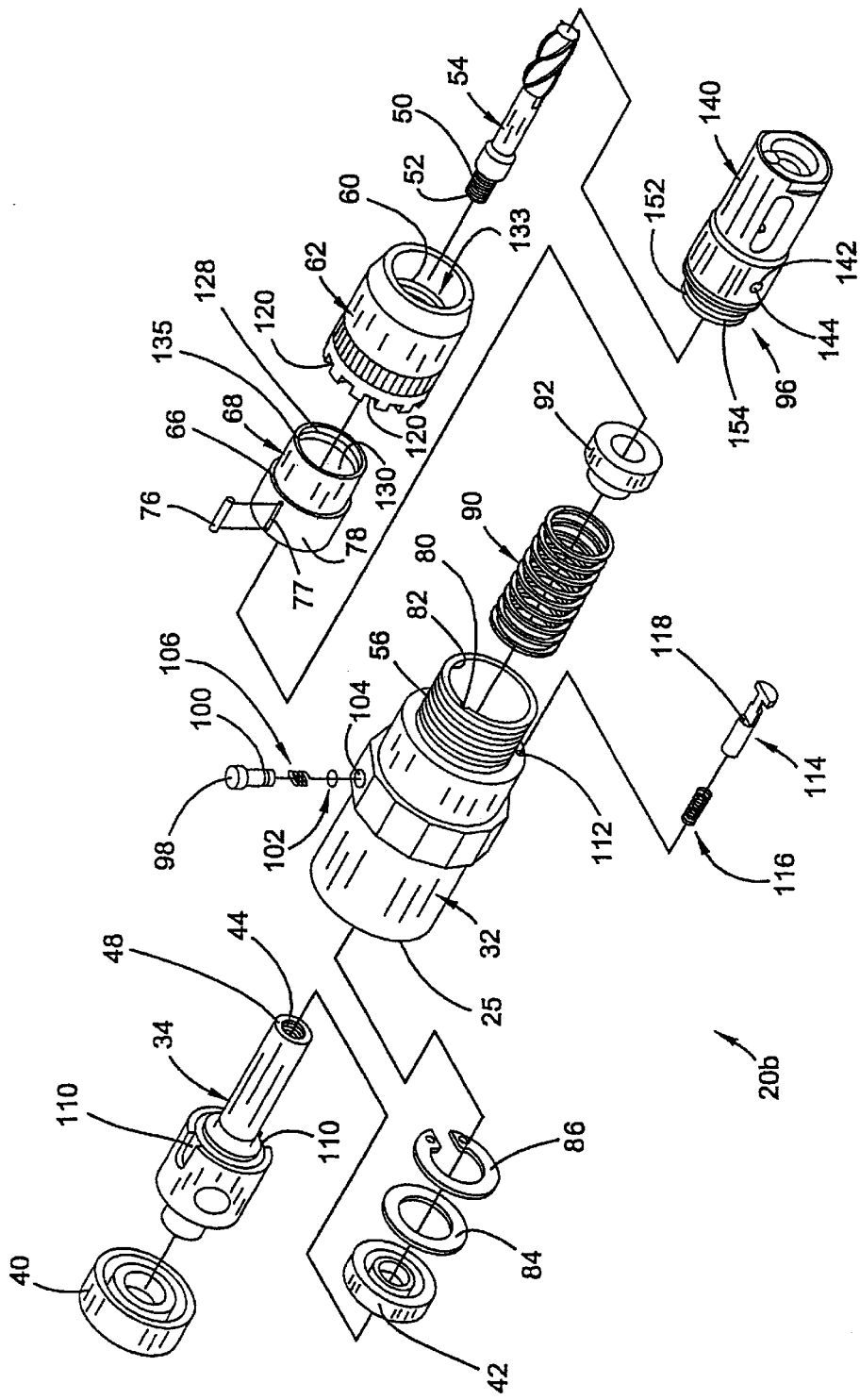
FIG. 5 is an exploded perspective view of the drill assembly shown in FIG. 4, showing the internal components thereof.

An internal flange 64 of the adjustable collar 62 abuts an external shoulder 66 of an adapter 68. The adapter 68 is positioned, and travels within, an internal passage 70 of the housing 32. The contact between the internal flange 64 of the adjustable collar 62 and the external shoulder 66 of the adapter 68 limits axial travel of the adapter 68 from the housing 32 within the internal passage 70. As shown in FIGS. 3 and 5, a key 76 is provided in a groove 77 on an external surface 78 of the adapter 68. The key 76 engages in a notch 80 provided on an internal surface 82 of the housing 32. This engagement provides that the adapter 68 cannot rotate substantially with respect to the housing 32 but can move axially within the internal passage 70 in the housing 32. The axial movement of the adapter 68 within the internal passage 70 in the housing 32 will be described more fully later herein.

Within the housing 32, located adjacent the bearing 42, are a washer 84 and a retaining ring 86. As shown, the retaining ring 86 engages in a recess 88 on the internal surface 82 of the housing 32. This engagement restricts movement of the spindle 34 within the housing 32. One having ordinary skill in the art would recognize alternative structure which may be provided to restrict axial movement of the spindle 34 within the housing 32.

A compression spring 90 is provided within the housing 32 between the retaining ring 86 and a bushing 92. The bushing 92 is positioned within the adapter 68 and contacts either a cutter housing 94 (in drill assembly 20a, see FIGS. 2 and 7–9) or a second adapter 96 (in drill assembly 20b, see FIGS. 10–12, 14, 16 and 17). As will be described later hereinbelow, the spring 90 compresses within the housing 32 during operation of the drill tool 22. As shown, the spring 90 as well as the spindle 34, the bearings 40 and 42, the washer 84, the retaining ring 86, the bushing 92, the adapter 68, the collar 62, and the cutter 54 are generally concentric about central axis 38.

A stop pin 98 is provided on the housing 32. The stop pin 98 has a groove 100 thereon for receiving a retainer 102, such as an o-ring, therein. The stop pin 98 is received in an opening 104 on the housing 32 such that the retainer 102 retains the stop pin 98 in the opening 104 and prevents easy removal of the stop pin 98 therefrom. A compression spring 106 surrounds the stop pin 98 and is received in an increased diameter section 108 of the opening 104. The compression spring 106 spring-loads the stop pin 98 to a position where the stop pin 98 is disengaged from the spindle 34. When the stop pin 98 is pressed into the opening 104, thereby compressing the compression spring 106, the stop pin 98 engages one of a pair of notches 110 provided on the spindle 34. This engagement between the stop pin 98 and the spindle 34 prevents the spindle 34 from rotating within the housing 32. The stop pin 98 is not meant to be engaged with the spindle 34 when the drive mechanism is driving the drive shaft to which the spindle 34 is engaged. Rather, the stop pin 98 is meant to be pressed into the opening 104 and engaged with the spindle 34 while the drive mechanism is not operating, in order to disengage the cutter 54 from the spindle 34.

The collar 62 is adjustable in that it can be threaded outwardly or inwardly relative to the housing 32 to decrease or increase, respectively, the depth of cut of the cutter 54 during operation of the drill tool 22 as will also be described more fully herein. An aperture 112 is provided on the housing 32 to contain a pin 114 and a corresponding spring 116 (for clarity, spring 116 is not shown in cross-section in any of the cross-sectional views). The pin 114 is designed with a narrow ridge 118 to engage one of corresponding slots 120 on the collar 62 (see FIGS. 3 and 5). The spring 116 pre-loads the pin 114 against the collar 62. The engagement between the ridge 118 of the pin 114 and the corresponding slot 120 on the collar 62 keeps the collar 62 from rotating with respect to the housing 34 during the operation of the drill tool 22. Hence, the desired position to which the collar 62 has been adjusted is maintained. When an adjustment of the collar 62 is needed, the pin 114 is pressed into the aperture 112 in the housing 32 to disengage the ridge 118 of the pin 114 from the corresponding slot 120, thereby allowing the collar 62 to be rotated relative the housing 32 and positioned as desired.

The two drill assemblies 20a and 20b provide two different functions. Drill assembly 20a is directed to be used to drill out a notch 24 in the head 26 of a rivet 28 (see FIGS. 7–9), and drill assembly 20b is directed to be used to drill the rivet 28 out of a workpiece 30 while holding the notch 24 in the head 26 of the rivet 28 to keep the rivet 28 from rotating during the drilling (see FIGS. 10–12, 14 and 16). As a result, there are distinctions between the structure of the two drill assemblies 20a and 20b, and these distinctions will now be discussed.

Drill assembly 20a, which is shown in FIGS. 1–3 and 7–9, will now be discussed. As mentioned, drill assembly 20a is directed to be used to drill out a notch 24 in the head 26 of a rivet 28. To this end, drill assembly 20a includes an offset cutter housing 94 having threads 124 on an outer surface 126 thereof for engaging threads 128 on an inner surface 130 of the adapter 68 (for simplicity, the threads 124 and 128 are depicted only in FIG. 3, and are omitted from FIGS. 2 and 7–9). As shown in FIGS. 2 and 7–9, when the cutter housing 94 is fully threadably engaged with the adapter 68, an external shoulder 131 on the cutter housing 94 contacts an end 135 of the adapter 68 and the cutter housing 94 extends from a bore 133 of the collar 62. At this time, the cutter housing 94 contacts the bushing 92 as a result of compression of the spring 90 within the housing 32.

As shown, the cutter housing 94 includes a cup portion 132 that defines a recess 134 for receiving the head 26 of the rivet 28. A cutter channel 136 in the cutter housing 94 communicates with the recess 134 defined by the cup portion 132. A central axis 138 of the recess 134 is displaced from central axis 38 which defines the axis of the cutter 54 and the cutter channel 136 in the cutter housing 94. Hence, the cutter 54 rotates (during operation of the drive mechanism of the drill tool 22) at a position which is displaced from the central axis 138 of the recess 134. As such, the cutter 52 can be used to drill a notch 24 into the rivet 28, in an outer ridge of the rivet head 26. The location of the cup portion 132 defines the position of the notch 24 formed, and assures that the notch 24 will be repeatably formed for a given type of rivet 28. Operation of the drill tool 22 and drill assembly 20a to drill a notch 24 in the head 26 of a rivet 28 will be described after the structure of drill assembly 20b is discussed.

Drill assembly 20b, which is shown in FIGS. 4, 5, 10–12, 14, 16 and 17, will now be discussed. As mentioned, drill assembly 20b is directed to be used to drill a rivet 28 out of a workpiece 30 while holding a notch 24 in the head 26 of the rivet 28 in order to keep the rivet 28 from rotating, during, the drilling.

Figure 6:
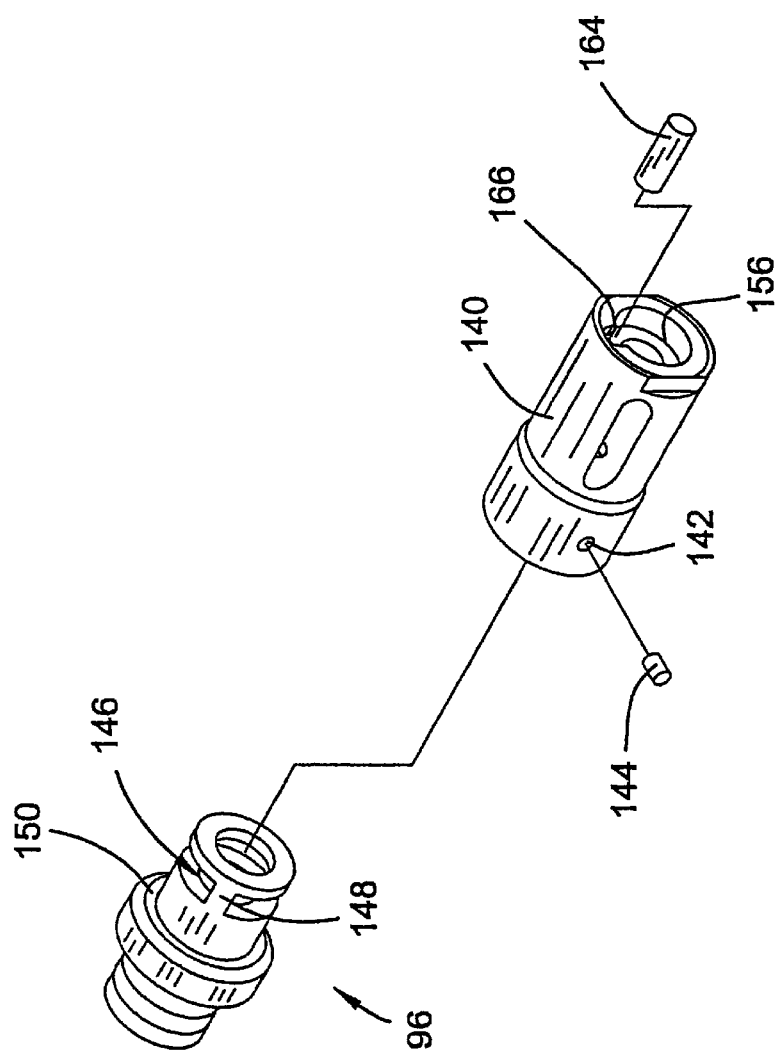
FIG. 6 is an exploded perspective view of a portion of the drill assembly shown in FIGS. 4 and 5.

Drill assembly 20b includes an anti-rotation housing 140. As shown in FIG. 6, the anti-rotation housing 140 has an aperture 142 therein for receiving a pin 144. The pin 144 engages a groove 146 in the second adapter 96. As shown, the groove 146 may cover a 340° range on the second adapter 96, leaving a 20° ridge 148 thereon. This provides that the anti-rotation housing 140 can rotate relative to the second adapter 96 through a range of 340°. Of course, alternative arrangements and structures may be provided, or the anti-rotation housing can be provided as being non-rotatable. To prevent relative rotation, the pin 144 may be received in a correspondingly shaped aperture in the second adapter 96.

The second adapter 96 includes an outwardly extending shoulder 150. When the second adapter 96 is received by the anti-rotation housing 140 and the pin 144 is engaged in the aperture 142 in the anti-rotation housing 140 and in the groove 146 in the second adapter 96, the anti-rotation housing 140 contacts the outwardly extending shoulder 150 of the second adapter 96 as shown in FIGS. 10–12, 14, 16 and 17.

The second adapter 96 includes threads 152 on an external surface 154 thereof for engaging the threads 128 on the inner surface 130 of the adapter 68 (for simplicity, the threads 152 and 128 are depicted only in FIG. 5, and are omitted from FIGS. 10–12, 14, 16 and 17). As shown in FIGS. 10–12, 14, 16 and 17, when the second adapter 96 is received by the anti-rotation housing 140 and the second adapter 96 is fully threadably engaged with the adapter 68, the outwardly extending shoulder 150 on the second adapter 96 contacts the end 135 of the adapter 68 and the anti-rotation housing 140 extends from the collar 62. At this time, the second adapter 96 contacts the bushing 92 as a result of compression of the spring 90 within the housing 32.

As shown, the anti-rotation housing 140 defines a recess 156 at an end thereof for receiving the head 26 of the rivet 28, and a cutter channel 158 in the anti-rotation housing 140 communicates with the recess 156. In contrast to the cutter housing 94, the anti-rotation housing 140 preferably provides that the recess 156 for receiving the head 26 of the rivet 28 is concentric with the central axis 38 which defines the axis of the cutter 54 and the cutter channel 158. Hence, the cutter 54 rotates (during operation of the drive mechanism of the drill tool 22) at a position which is preferably aligned with a central axis of the rivet 28.

Notch-engaging structure 162 is provided in the anti-rotation housing 140. For example, preferably a pin 164 is provided as being retained in a corresponding slot 166 in the internal surface 168 of the anti-rotation housing 140. The pin 164 is provided for engagement with the notch 24 in the head 26 of the rivet 28 during operation of the drill tool 22 as will be described more fully herein.

Operation of the drill tool 22 and drill assembly 20a to drill a notch 24 in the head 26 of a rivet 28 will now be described. Initially, the drill assembly 20a is coupled to the drill tool 22 as shown in FIG. 1. Then, pin 114 is pressed into the aperture 112 in the housing 32 and the collar 62 is rotated to a desired position relative to the housing 32. After the collar 62 is so positioned, the pin 114 is released so that the ridge 118 engages with a slot 120 on the collar 62. As mentioned, the engagement between the ridge 118 of the pin 114 with a slot 120 on the collar 62 provides that the collar 62 cannot rotate relative to the housing 32 during operation of the drill tool 22.

Figure 2:
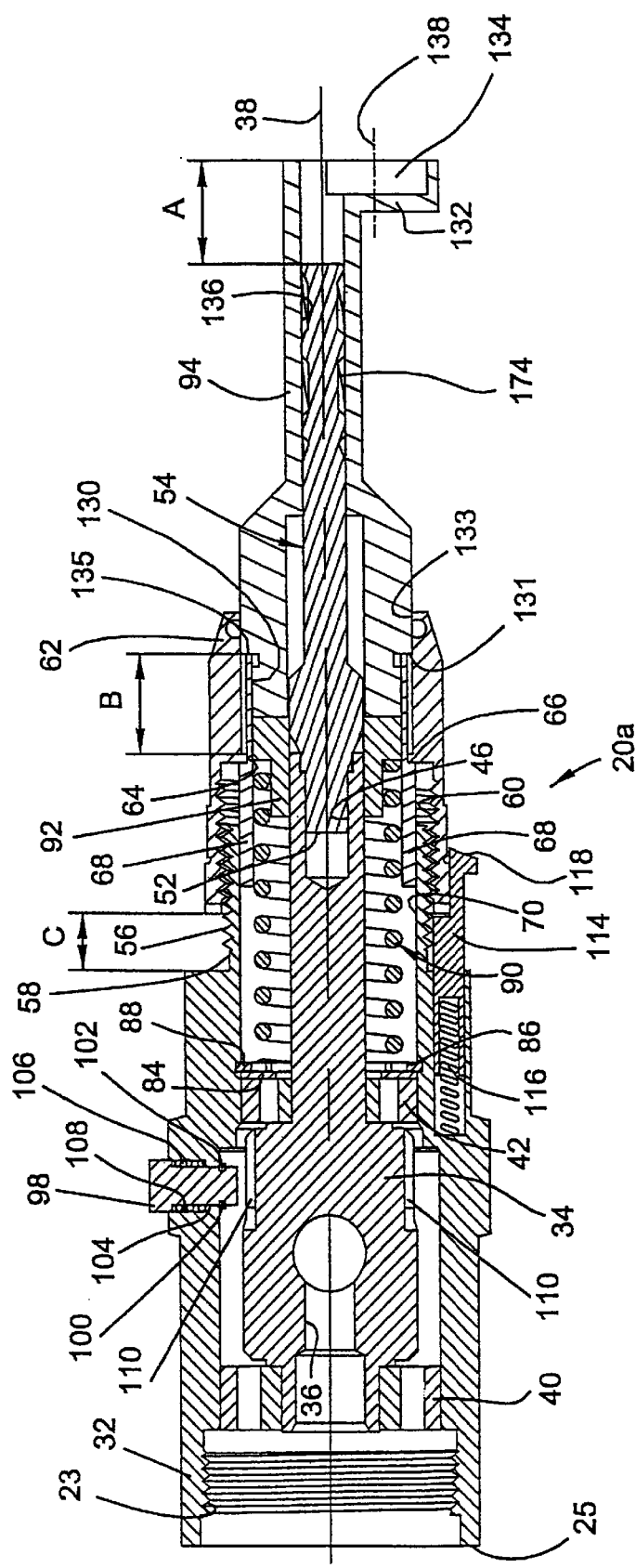
FIG. 2 is a cross-sectional, side elevational view, taken along line 2—2 of FIG. 1, of the drill assembly shown in FIG. 1.

Adjustment of the collar 62 inwardly along the axis 38 will decrease dimension C and dimension A (depicted in FIG. 2). Decreasing dimension A will increase the depth of cut created by the cutter 54. In contrast, adjustment of the collar 62 outwardly along the axis 38 will increase dimension C and dimension A, and increasing dimension A will decrease the depth of the cut created by the cutter 54. The stroke of the cut is defined by dimension B and is generally constant because the distance between the internal flange 64 of the adjustable collar 62 and external shoulder 131 of the cutter housing 94 does not change as a result of rotating the collar 62 relative to the housing 32. Regardless of the position at which the collar 62 is set, the spring 90 presses the bushing 92 against the cutter housing 94. Because the internal flange 64 of the adjustable collar 62 is contactably engaged against the external shoulder 66 of the adapter 68 and the adapter 68 is threadably engaged with the cutter housing 94, setting the position of the collar 62 relative to the housing 32 essentially sets the initial position of the end of the cutter 54 relative to the recess 134 which receives the rivet head 26. Therefore, setting the position of the collar 62 relative to the housing 32 sets the depth the cutter 54 will cut into the head 26 of the rivet 28. In other words, setting the position of the collar 62 relative to the housing 32 sets what percentage of the total stroke the cutter 54 will be cutting into the head 26 of the rivet 28. Limiting the travel of the cutter 54 prevents damage to a surface 168 of the workpiece 30 immediately behind the notch 24.

Figure 7:
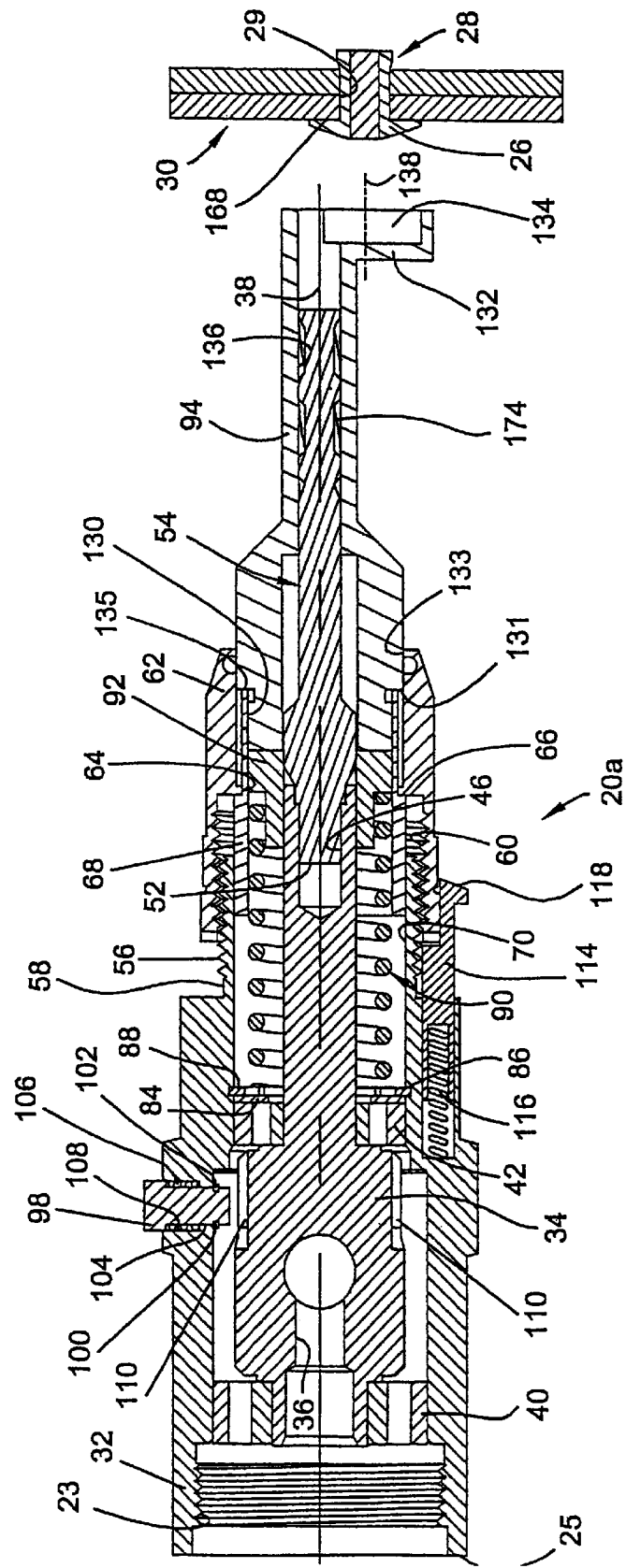
FIG. 7 is a cross-sectional, side elevational view similar to that of FIG. 2, showing the drill assembly of FIG. 1 aligned with a rivet in a workpiece.
Figure 8:
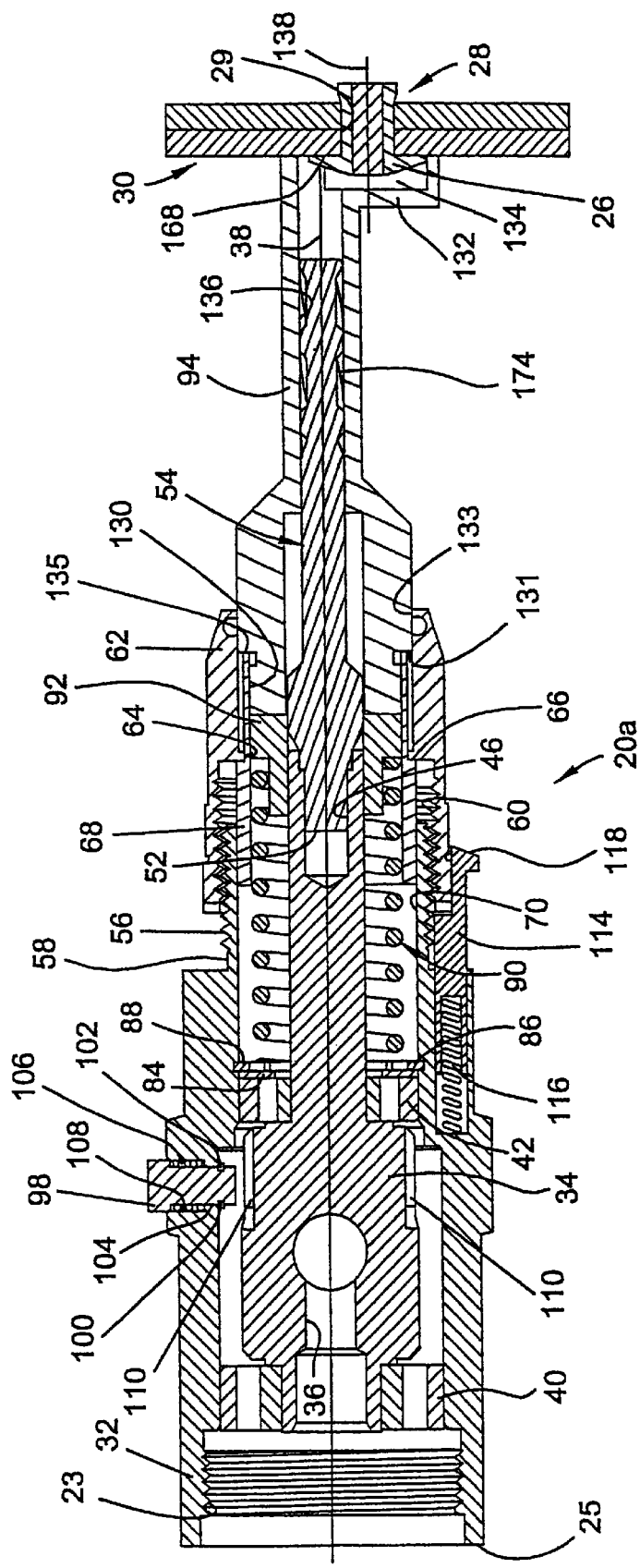
FIG. 8 is a cross-sectional, side elevational view similar to that of FIG. 7, showing the rivet received in a recess in the drill assembly.

After the collar 62 is set to the desired position relative to the housing 32 and after the collar 62 is locked in place by releasing the pin 114, the coupled drill tool 22 and drill assembly 20a is aligned with the rivet 28 as shown in FIGS. 1 and 7, and then the cup portion 132 is brought into engagement with the rivet 28 such that the head 26 of the rivet 28 is received by the recess 134 as shown in FIG. 8.

Figure 9:
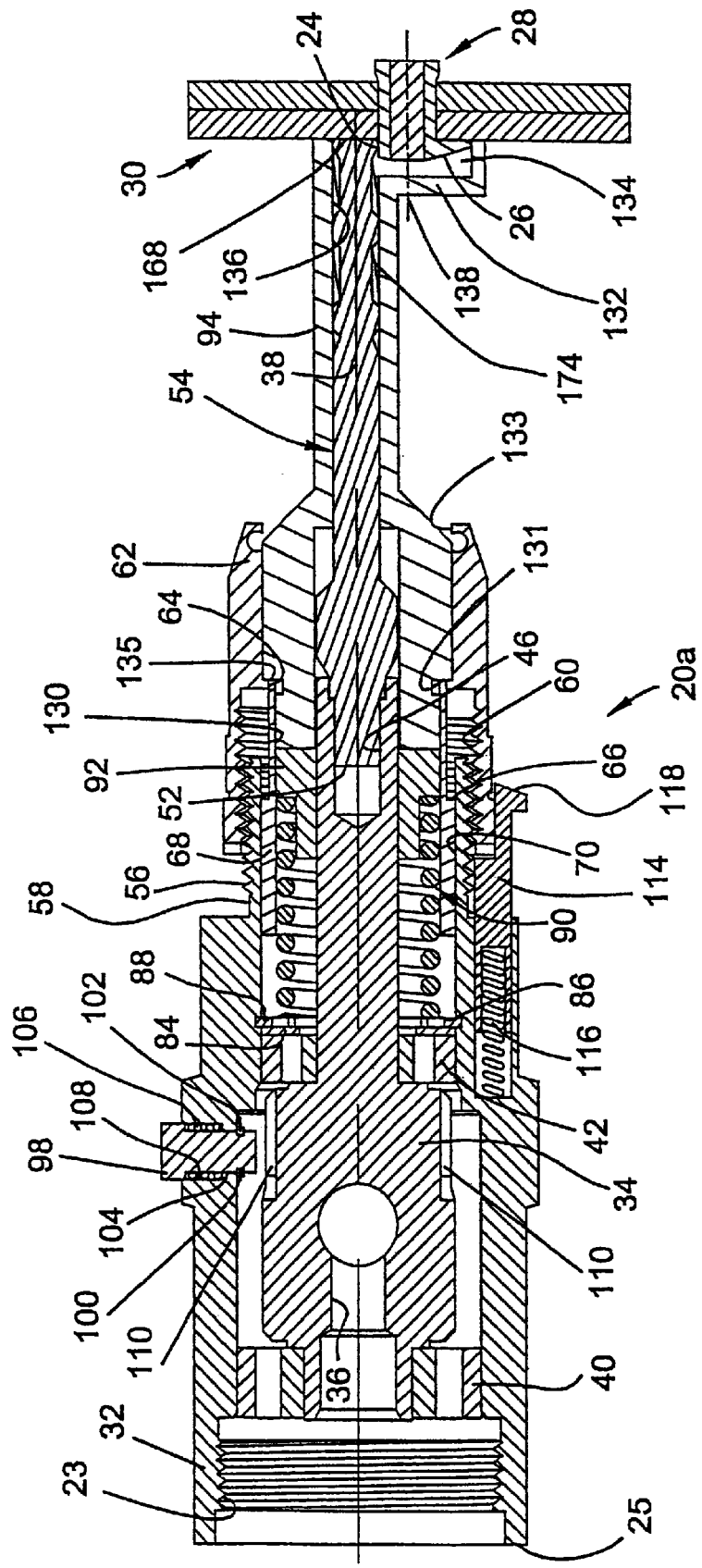
FIG. 9 is a cross-sectional, side elevational view similar to that of FIGS. 7 and 8, showing a notch being drilled in a head of the rivet.

Then, the drill tool 22, and more specifically the drive mechanism thereof, is operated to cause the cutter 54 to rotate and the drill tool 22 is pressed towards the recess 134 and the workpiece 30. This pressing of the drill tool 22 towards the recess 134 causes the rotating cutter 54 to move towards the rivet 28, causes the spring 90 to compress inside the housing 32, and causes the collar 62 to move axially relative to the cutter housing 94. As the drill tool 22 is pressed further towards the recess 134, the cutter 54 cuts into the head 26 of the rivet 28, as shown in FIG. 9, thereby cutting a notch 24 therein. Preferably, the collar 62 had been adjusted such that at the end of the stroke of the cut, the cutter 54 does not quite contact the surface 168 of the workpiece 30. However, this is not imperative as the operator may stop pressing the drill tool 22 toward the recess 134 short of the complete stroke of the cutter 54 but after a notch 24 has been cut into the head 26 of the rivet 28. As shown in FIG. 9, at the end of the stroke, the internal flange 64 of the adjustable collar 62 contacts the external shoulder 131 of the cutter housing 94.

After the notch 24 is cut into the head 26 of the rivet 28, the drill tool 22 can be eased backward, in a direction away from the recess 134. The spring 90 in the housing 32 assists in causing the drill assembly 20a to re-position to that which is shown in FIG. 7. Then, the drill assembly 20a can be replaced with drill assembly 20b to drill out the rivet 28.

After drill assembly 20a is replaced with drill assembly 20b, the collar 62 can be adjusted relative to the housing 32 as described above to set the depth of cut of the cutter 54. Typically, the collar 62 will be adjusted such that the depth of cut is somewhat greater than that which was utilized during the drilling of the notch 24.

Figure 10:
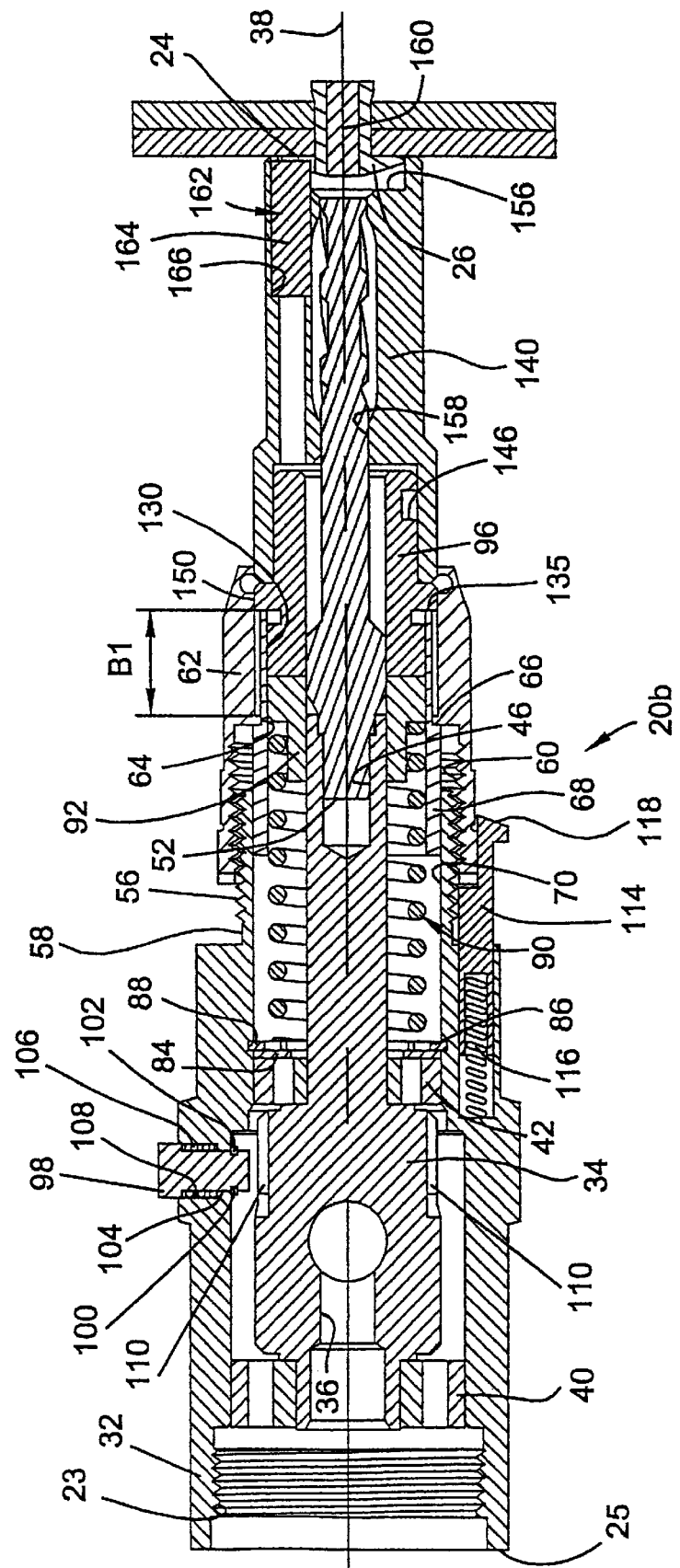
FIG. 10 is a cross-sectional, side elevational view, taken along line 10—10 of FIG. 4, of the drill assembly shown in FIG. 4, showing the drill assembly engaged with a notch in the head of the rivet which, preferably, has been formed using the drill assembly shown in FIGS. 1, 2, 3, 7, 8 and 9.

After the collar 62 is set to the desired position relative to the housing 32 and after the collar 62 is locked in place as described hereinabove, the drill assembly 20b while coupled to the drill tool 22, is aligned with the rivet 28 as shown in FIG. 4, and then, as shown in FIG. 10, the anti-rotation housing 140 is brought into engagement with the rivet 28 such that the head 26 of the rivet 28 is received by the recess 156 and the notch-engaging structure 162 is received by the notch 24 which, preferably, has been formed in the head 26 of the rivet 28 using drill assembly 20a as described hereinabove. In order to align the notch-engaging structure 162 with the notch 24 formed in the rivet 28, the operator may rotate the anti-rotation housing 140 causing the pin 144 shown in FIG. 6 to travel within the groove 146 on the second adapter 96.

Figure 11:
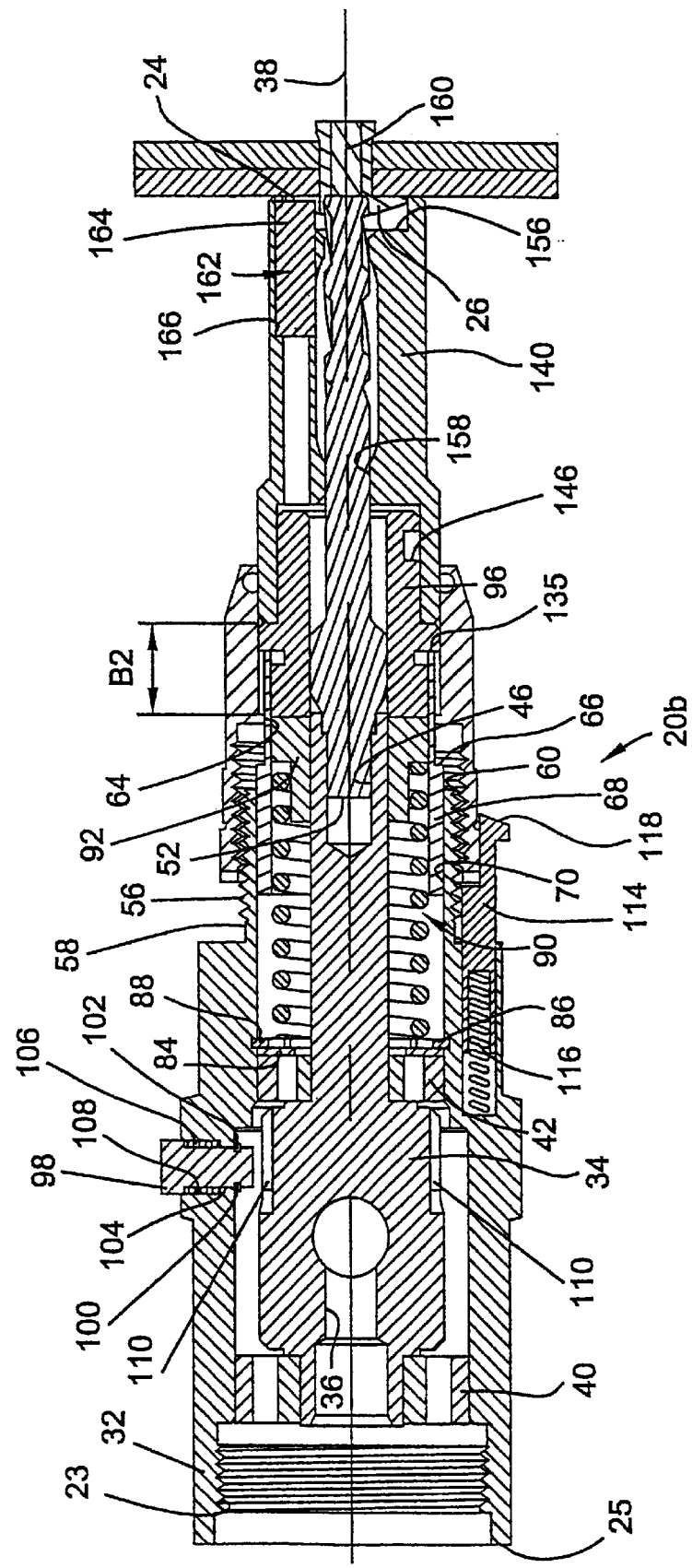
FIG. 11 is a cross-sectional, side elevational view similar to that of FIG. 10, showing the head of the rivet being drilled into while the drill assembly holds the notch in the head of the rivet.

Then, the drill tool 22, and more specifically the drive mechanism thereof, is operated to cause the cutter 54 to rotate and the drill tool 22 is pressed towards the recess 154 and the workpiece 30. This pressing of the drill tool 22 towards the recess 154 causes the rotating cutter 54 to move towards the rivet 28, causes the spring 90 to compress inside the housing 32, and causes the collar 62 to move axially relative to the anti-rotation housing 140. Stroke dimension B1 shown in FIG. 10 identifies the position of the cutter 54 before engagement with the rivet 28. As the drill tool 22 is pressed further towards the recess 154, the cutter 54 contacts and begins to cut into the rivet 28 as shown in FIG. 11. Stroke dimension B2 identifies the position of the cutter 54 at this time. Should the rivet 28 begin to spin in the bore 29 as a result of the cutting thereinto by the cutter 54, the anti-rotation housing 140 will rotate therewith (due to the engagement between the notch-engaging structure 162 and the notch 24 in the rivet 28) until the pin 144 contacts the ridge 148 on the second adapter 96.

Figure 16:
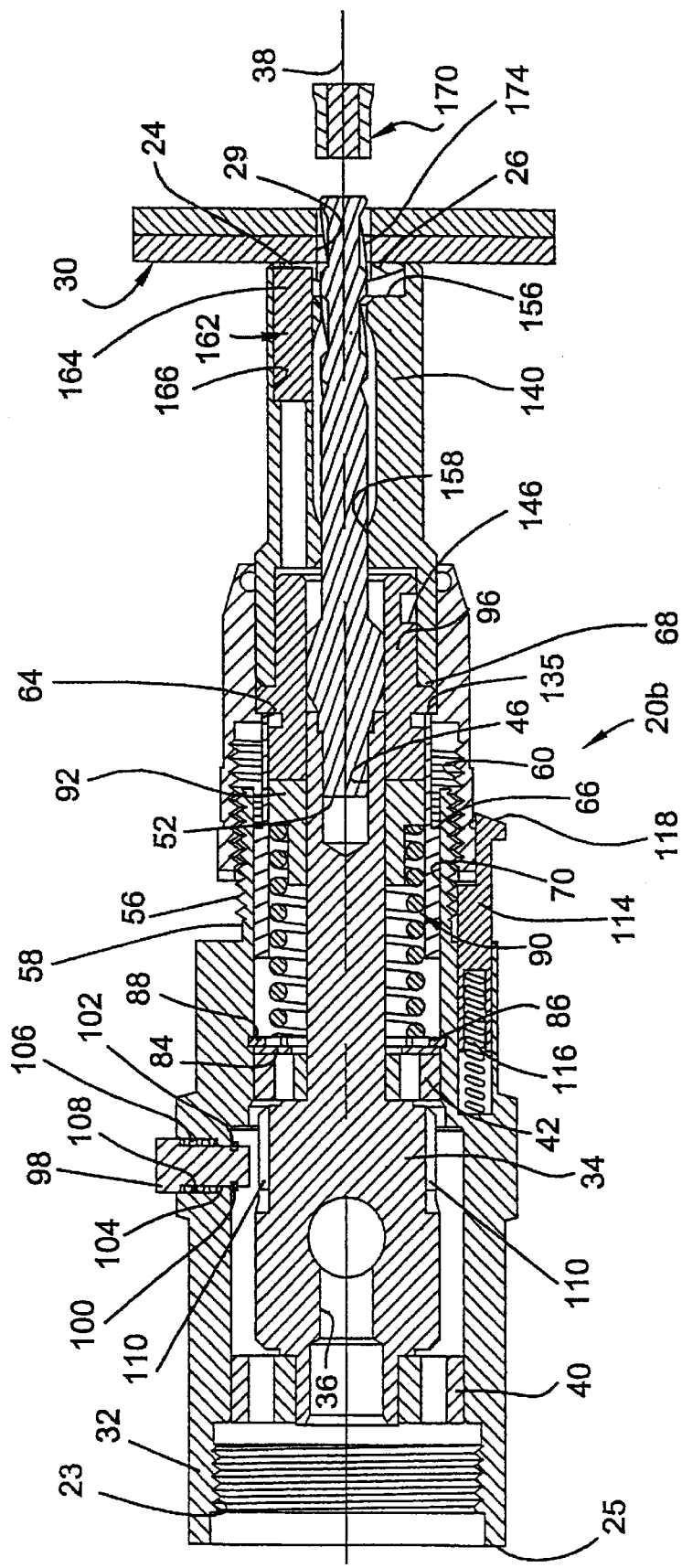
FIG. 16 is a cross-sectional, side elevational view similar to that of FIGS. 12 and 14, showing the rivet having been drilled out of the workpiece while the drill assembly is still holding the head of the rivet.
Figure 17:
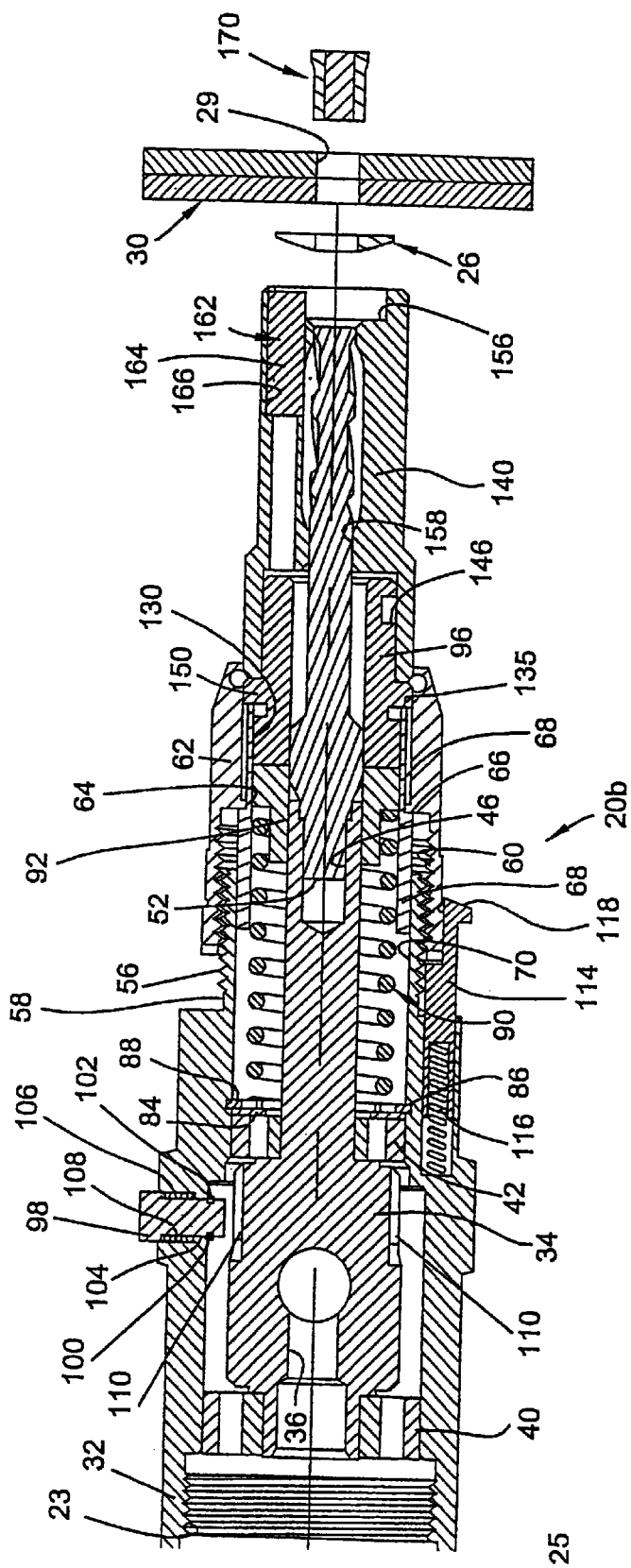
FIG. 17 is a cross-sectional, side elevational view similar to that of FIGS. 12, 14 and 16, showing the rivet having been drilled out of the workpiece and showing the drill assembly disengaged from the head of the rivet.

As the drill tool 22 is pressed further towards the recess 154, the cutter 54 cuts further into the rivet 28 as shown in the progression of FIG. 11 to FIG. 12 to FIG. 14 to FIG. 16. As shown in FIG. 16, at the end of the stroke or "at bottoming out" (see the progression of stroke dimension B1 to B2 to B3 to B4 to that which is shown in FIG. 16), the internal flange 64 of the adjustable collar 62 contacts the outwardly extending shoulder 150 of the second adapter 96. Preferably, as shown in FIGS. 16 and 17, the head 26 of the rivet 28 eventually becomes separated from the rivet body 170. At this point, the rivet 28 has been sufficiently milled out and may even become disengaged from the workpiece 30. This operation leaves the workpiece bore 29 intact without any damage thereto as a result of canting or rotation of the rivet 28 within the bore 29.

Preferably, a cutter 54 is provided such that the same cutter can be used to perform both of the above-described operations, namely, the cutting of the notch 24 in the rivet 28 and the drilling out of the rivet body 170 while holding the notch 24. To this end, the cutter 54 may have a tapered front portion 172 (see FIGS. 13 and 15) which is slightly smaller in width dimension than the size of the rivet to be milled out of the workpiece bore 29. For example, if a quarter-inch rivet is to be milled out, the cutter 54 may have a tapered front portion 172 having a diameter of approximately 0.200 inch and may have a body portion 174 having a slightly larger dimension of approximately 0.250 inch. Preferably, both the face and the outside diameter of the cutter 54 provide a cutting edge.

By providing that the end portion 172 of the cutter 54 is tapered, the cutter 54 will not tend to displace from the longitudinal axis of a rivet 28 during drilling. The size of the bore 29 in the workpiece 30 in which the rivet 28 is secured is typically substantially the same size as the rivet 28. For example, the bore 29 in the workpiece 30 will be substantially 0.25 inch for a 0.25 inch diameter rivet. If the end of the cutter 54 is provided as being the same size, namely 0.25 inch, at the stage shown, for example, in FIG. 11, the rivet head 26 will tend to separate from the rivet body 174 and the drill tool 22 will lose support for further axial drilling. As a result, the cutter 54 may displace from the longitudinal axis of the rivet 28 and may skid across the surface of the workpiece 30 thereby damaging the workpiece 30 and creating a work hazard. By providing that the front portion 172 of the cutter 54 is somewhat smaller than the bore 29 in the workpiece 30, for example, 0.200 inch for a 0.250 inch workpiece bore 29, the rivet body 170 will not tend to separate from the rivet head 26 so soon in the drilling process. As such, the rivet body 170 can continue to support and locate the cutter 54 in alignment with the central axis of the rivet 28. As noted above, the anti-rotation housing 140 essentially positions the cutter 54 coaxial with the rivet 28 using the head 26 as a point of reference. If the rivet head 26 is disengaged from the rivet body 170 at the onset of drilling out the rivet 28, the reference point for the operation is no longer available.

Figure 12:
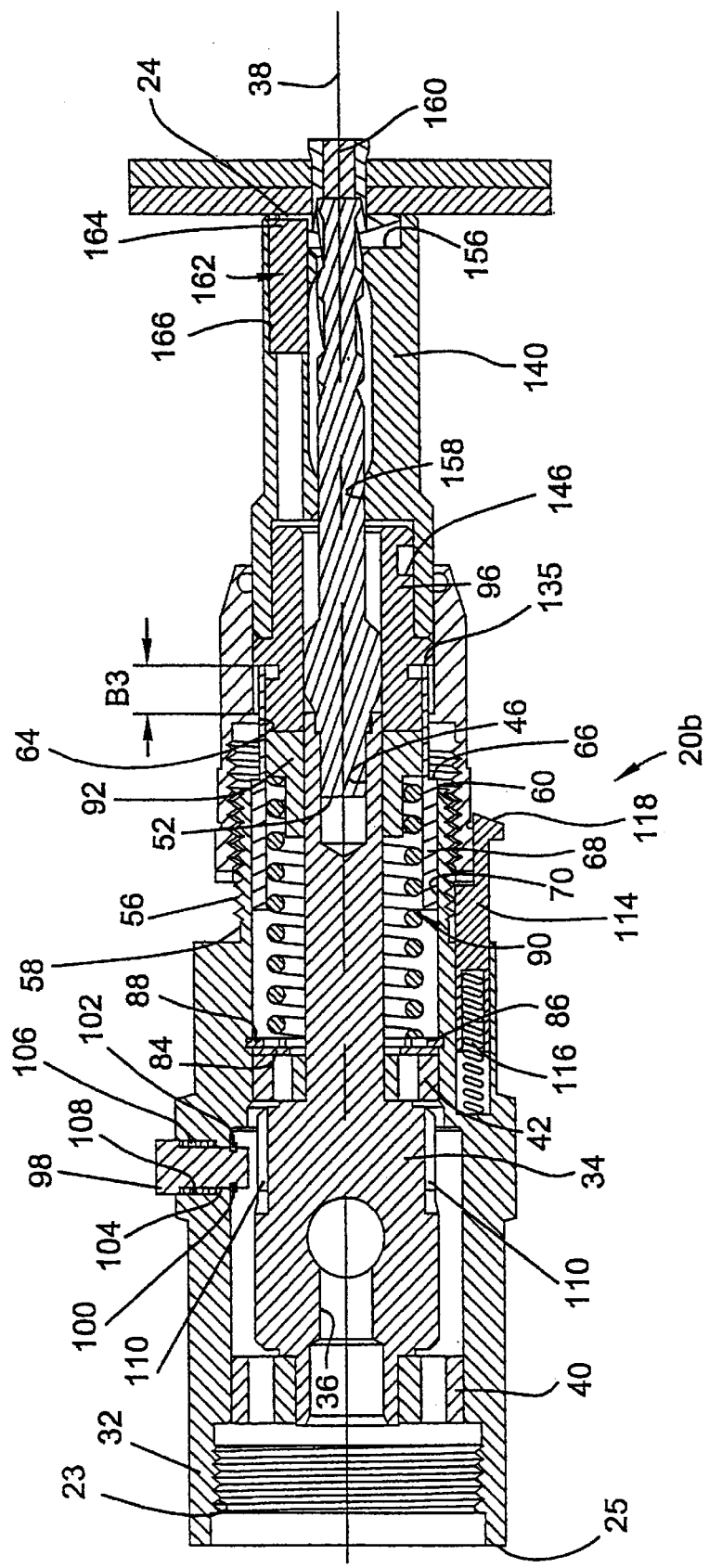
FIG. 12 is a cross-sectional, side elevational view similar to that of FIG. 11, showing the rivet being drilled further into while the drill assembly holds the notch in the head of the rivet.
Figure 13:
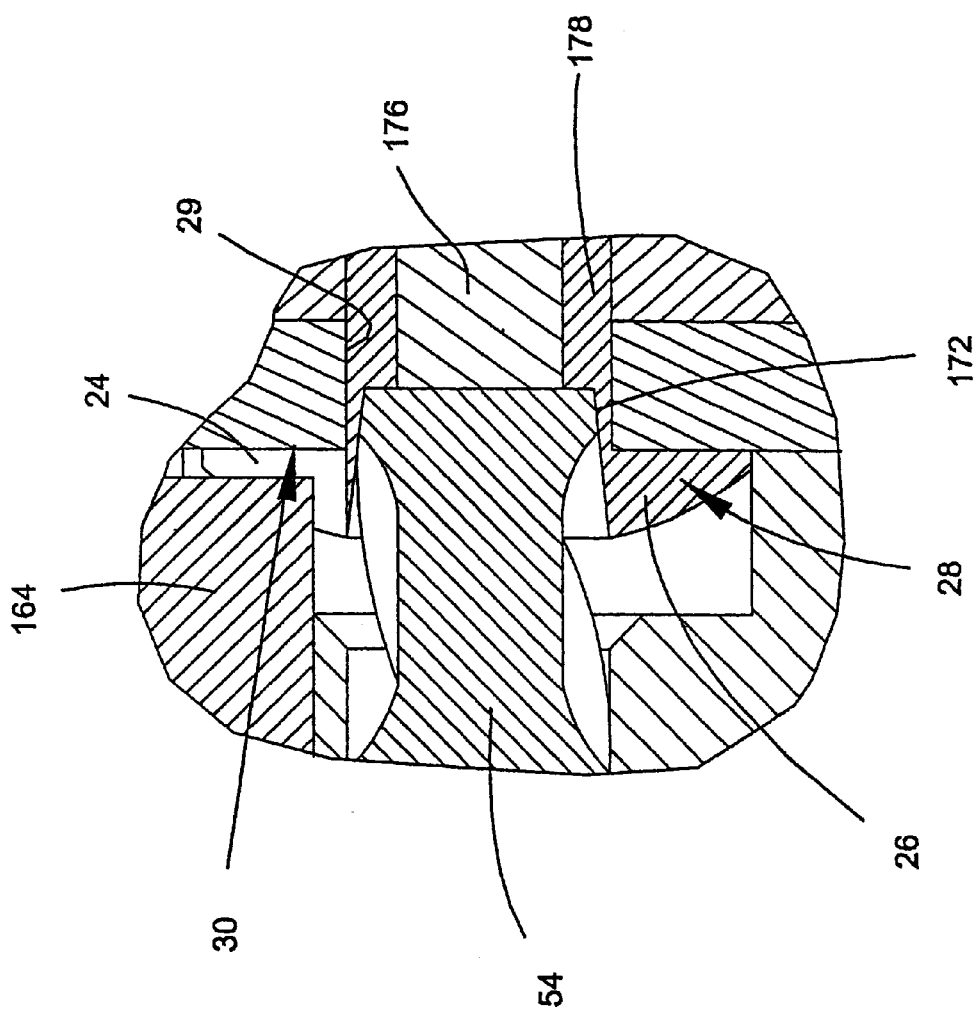
FIG. 13 is an enlarged view of a portion of that which is depicted in FIG. 12.
Figure 14:
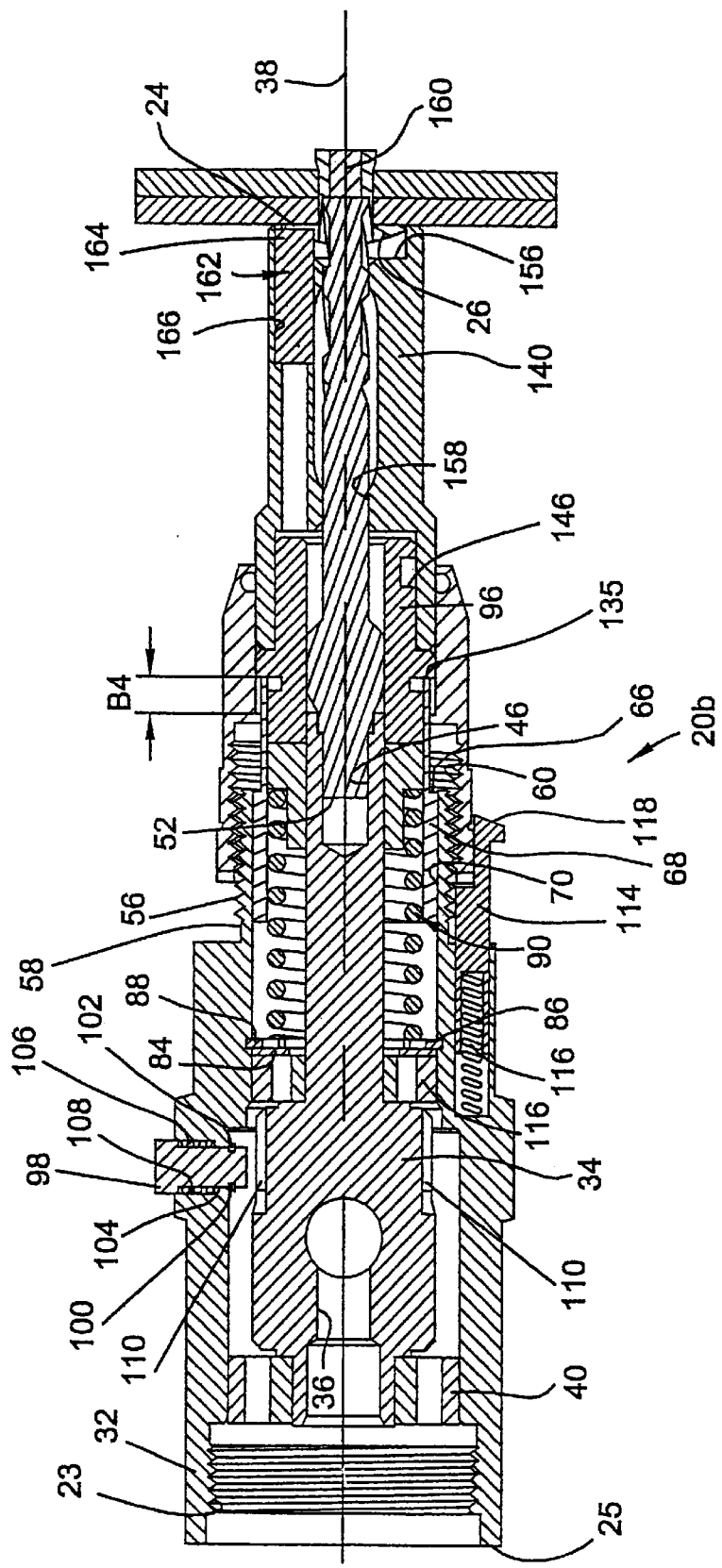
FIG. 14 is a cross-sectional, side elevational view similar to that of FIG. 12, showing the rivet being drilled further into while the drill assembly holds the notch in the head of the rivet.
Figure 15:
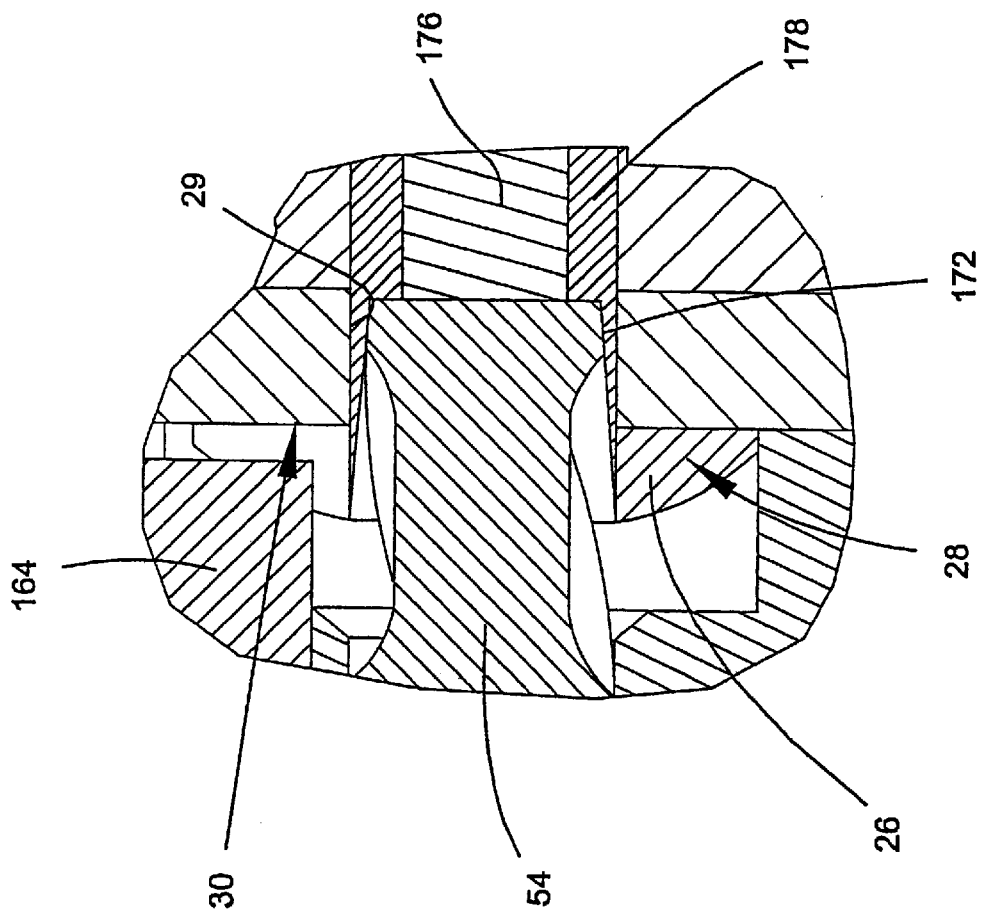
FIG. 15 is an enlarged view of a portion of that which is depicted in FIG. 14.

Preferably, the cutter 54 is selected such that as the cutter 54 progresses to the position shown in FIG. 12, material is removed from the stem 176 and sleeve 178 of the rivet 28 without completely severing the material connection between the sleeve 178 and the head 26 (see FIG. 13 which is an enlargement of a portion of that which is depicted in FIG. 12). This will provide greater stability in the milling operation and prevent wobbling of the rivet 28 in, and enlargement of, the workpiece bore 29. Further axial displacement of the cutter 54 along the central axis of the rivet 28 to the position shown in FIG. 14 ultimately results in the body portion 174 of the cutter 54 engaging the rivet body 170 which removes the material connection between sleeve 178 and the rivet head 26 (see FIG. 15 which is an enlargement of a portion of that which is depicted in FIG. 14). Ultimately, the stem 176 and sleeve 178 disengage from the head 26 and continued axial displacement of the cutter 54 through the workpiece bore 29 will push the rivet body 170 from the workpiece bore 29 as shown in FIGS. 16 and 17. Preferably, the head 26 is retained within the recess 154 until the milling operation is complete.

While a preferred embodiment of the present invention is shown and described, it is envisioned that those skilled in the art may devise various modifications of the present invention without departing from the spirit and scope of the appended claims. The present invention is not meant to be limited by the foregoing disclosure.

What is claimed is:

1. A drill assembly for facilitating removal of a rivet from a workpiece, said drill assembly comprising:
    a cutter housing having an end portion defining a recess for receiving a head of the rivet, a channel communicating with said recess for receiving a cutter for cutting a notch in the head of the rivet, a longitudinal axis of said channel being offset from a longitudinal axis of the rivet when the head of the rivet is positioned in said recess.

2. A drill assembly as recited in claim 1, said cutter housing alignable with a tool, said tool providing a drive mechanism for driving said cutter.

3. A drill assembly as recited in claim 1, further comprising a collar having a bore receiving said cutter housing, said collar slidable along said cutter housing upon placing said end portion of said cutter housing against a surface and upon urging said collar towards said end portion of said cutter housing.

4. A drill assembly as recited in claim 2, further comprising a housing engageable with said drive mechanism and a collar adjustably secured to said housing, said collar having a bore receiving said cutter housing, said collar slidable along said cutter housing upon placing said end portion of said cutter housing against a surface and upon urging said drive mechanism towards said end portion of said cutter housing.

5. A drill assembly as recited in claim 4, said collar contactably engageable with said cutter housing to limit the travel of said drive mechanism towards said end portion of said cutter housing.

6. A drill assembly as recited in claim 5, further comprising an adapter secured to said cutter housing and contactable with said collar to limit the travel of said cutter housing from said bore of said collar.

7. A drill assembly as recited in claim 3, further comprising a bushing engaged against another end of said cutter housing, and a spring engaged against said bushing to urge said cutter housing from said bore of said collar.

8. A drill assembly as recited in claim 4, further comprising a spindle engaged with said drive mechanism and engaged with said cutter, said spindle having a notch thereon, a retainer being on said housing and engageable with said notch to prevent rotation of said spindle.

9. A drill assembly as recited in claim 3, said collar adjustable in relation to said cutter housing to position said cutter in relation to said end portion of said cutter housing thereby setting the depth of cut into the rivet by the cutter.

10. A drill assembly as recited in claim 3, further comprising a retainer in said housing engageable against said collar to prevent rotation thereof during rotation of said cutter.

11. A drill assembly as recited in claim 1, further comprising an anti-rotation housing having an end portion defining a recess for receiving the head of the rivet, said anti-rotation housing having a channel for receiving said cutter, said channel communicating with said recess; and notch-engaging structure in said anti-rotation housing and communicating with said recess, said notch-engaging structure engageable with the notch cut in the head of the rivet to prevent rotation of the rivet when said cutter is applied against the head of the rivet.

12. A drill assembly as recited in claim 11, further comprising a second adapter securable to said adapter, said anti-rotation housing securable to said second adapter, said anti-rotation housing engageable with the head of the rivet.

13. A drill assembly as recited in claim 12, further comprising a retainer on said anti-rotation housing, said retainer engageable with said second adapter thereby limiting the rotation of said anti-rotation housing.

14. A drill assembly as recited in claim 11, said notch-engaging structure comprising a pin received in a slot defined by an internal surface of said anti-rotation housing.

15. A drill assembly for engaging a notch in a head of a rivet in a workpiece while cutting generally into a longitudinal axis of the rivet, said drill assembly comprising: an anti-rotation housing having an end portion defining a recess for receiving the head of the rivet; notch-engaging structure in said anti-rotation housing for engaging the notch in the head of the rivet when the head of the rivet is received by the recess defined by the end portion of the anti-rotation housing, said anti-rotation housing having a channel in communication with said recess for receiving a cutter for cutting generally into the longitudinal axis of said rivet.

16. A drill assembly as recited in claim 15, further comprising an other housing having an end portion engageable with a tool, said tool providing a drive mechanism coupleable to said cutter for driving said cutter.

17. A drill assembly as recited in claim 15, further comprising a collar having a bore receiving said anti-rotation housing, said collar slidable along said anti-rotation housing upon placing said end portion of said anti-rotation housing against a surface and upon urging said collar towards said end portion of said anti-rotation housing.

18. A drill assembly as recited in claim 16, further comprising a collar adjustably secured to said other housing, said collar having a bore receiving said anti-rotation housing, said collar slidable along said anti-rotation housing upon placing said end portion of said anti-rotation housing against a surface and upon urging said drive mechanism towards said end portion of said anti-rotation housing.

19. A drill assembly as recited in claim 18, further comprising an adapter secured to said anti-rotation housing, said adapter engageable with said collar to limit the travel of said collar towards said end portion of said anti-rotation housing.

20. A drill assembly as recited in claim 17, further comprising a bushing engaged against another end of said anti-rotation housing, and a spring engaged against said bushing to urge said anti-rotation housing out said bore of said collar.

21. A drill assembly as recited in claim 16, further comprising a spindle engaged with said drive mechanism and engaged with said cutter, said spindle having a notch thereon, a retainer being on said housing and engageable with said notch to prevent rotation of said spindle.

22. A drill assembly as recited in claim 19, said collar adjustable in relation to said anti-rotation housing to position said cutter in relation to said end portion of said anti-rotation housing thereby setting the depth of cut into the rivet by the cutter.

23. A drill assembly as recited in claim 18, further comprising a retainer in said housing engageable against said collar to prevent rotation thereof during, rotation of said cutter.

24. A drill assembly as recited in claim 15, said notch-engaging structure comprising a pin received in a slot defined by an internal surface of said anti-rotation housing.

25. A method of removing a rivet in a workpiece, said method comprising: cutting a notch in a head of the rivet, said notch offset from a central longitudinal axis of the rivet; engaging said notch; and while engaging said notch, cutting into said rivet generally along said central longitudinal axis thereof.

26. A method as recited in claim 25, further comprising using a cutter having a tapered end to cut into said rivet generally along said central longitudinal axis thereof.

27. A method of removing a rivet in a workpiece, said rivet having a notch, said method comprising engaging the notch of the rivet; and while engaging the notch, cutting into the rivet generally along a central longitudinal axis thereof.

28. A method of using a tool to remove a rivet in a workpiece, said method comprising:

using said tool to cut a notch in a head of the rivet; and after cutting said notch, using said tool to simultaneously engage said notch and cut into said rivet generally along a central longitudinal axis thereof.

29. A system for facilitating the removal of a rivet from a workpiece, said system comprising:

a first housing engageable with said drive mechanism, said first housing having an end portion defining a recess for receiving a head of the rivet, a channel communicating with said recess for receiving a cutter engaged with said drive mechanism for rotating said cutter and cutting a notch in the head of the rivet, a longitudinal axis of said channel being offset from a longitudinal axis of the rivet when the head of the rivet is positioned in said recess; and a second housing engageable with said drive mechanism, said second housing having an end portion defining a recess for receiving the head of the rivet, said second housing having a channel for receiving said cutter, said channel communicating with said recess, and notch-engaging structure in said second housing engageable with the notch cut in the head of the rivet to prevent rotation of the rivet when said cutter is applied against the head of the rivet.

* * * * *